US012267888B2

(12) United States Patent
Fanara (10) Patent No.: US 12,267,888 B2
(45) Date of Patent: Apr. 1, 2025

(54) AUTOMATIC PAIRING BETWEEN WIRELESS ELECTRONIC DEVICES AND IN-VEHICLE ENTERTAINMENT SYSTEM (71) Applicant: Panasonic Avionics Corporation, Irvine, CA (US)

(72) Inventor: Philip A. Fanara, La Habra, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 435 days.

(21) Appl. No.: 17/819,486

(22) Filed: Aug. 12, 2022

(65) Prior Publication Data
US 2024/0057177 A1 Feb. 15, 2024

(51) Int. Cl.
H04W 76/10 (2018.01)
(52) U.S. Cl.
CPC .................. H04W 76/10 (2018.02)
(58) Field of Classification Search
CPC ....................................... H04W 76/10
See application file for complete search history.

(56) References Cited

U.S. PATENT DOCUMENTS

| | | | | |
|---|---|---|---|---|
| 2017/0182957 A1* | 6/2017 | Watson | ................ | H04L 67/125 |
| 2017/0220490 A1* | 8/2017 | Tan | ....................... | G06F 1/1662 |
| 2018/0317071 A1* | 11/2018 | Rabii | ..................... | H04W 12/50 |
| 2021/0160697 A1* | 5/2021 | Zheng | ................... | H04W 76/38 |
| 2022/0394794 A1* | 12/2022 | Zhang | ............... | H04W 28/0215 |
| 2024/0296007 A1* | 9/2024 | Zhang | ..................... | G06F 9/451 |

OTHER PUBLICATIONS

Extended European Search Report from European Patent Application No. 23191181.9 dated Dec. 14, 2023.

* cited by examiner

Primary Examiner — Chi H Pham
Assistant Examiner — Weibin Huang
(74) Attorney, Agent, or Firm — Perkins Coie LLP (57) ABSTRACT An apparatus for assisting a pairing operation is provided. The apparatus comprises: a processor included in an intermediate device in communication with a source device to which a wireless electronic device is to be wirelessly connected through the pairing operation; and a storage included in the intermediate device and in communication with the processor, the storage configured to store pairing information of the wireless electronic device, the pairing information including a profile of the wireless electronic device that enables to complete the pairing operation with the source device. The storage further stores instructions, upon being executed, to instruct the processor to: determine to initiate the pairing operation for the wireless electronic device; and provide the pairing information of the wireless electronic device to the source device such that a wireless communication link is established between the wireless electronic device and the source device based on the pairing information of the wireless electronic device.

18 Claims, 9 Drawing Sheets

AUTOMATIC PAIRING BETWEEN WIRELESS ELECTRONIC DEVICES AND IN-VEHICLE ENTERTAINMENT SYSTEM

TECHNICAL FIELD

This document is generally related to systems, methods, and apparatus to provide entertainment to passengers in commercial passenger vehicles such as airplanes, passenger trains, buses, cruise ships, and other forms of transportation.

BACKGROUND

Commercial travel has evolved with the increasing popularity of personal electronic devices (PEDs) that passengers carry on board, as well as media play devices provided in commercial passenger vehicles. Techniques that provide passengers in commercial passenger vehicles access to a large variety of entertainment content with minimal or no disruption will enhance a positive travel experience.

SUMMARY

This patent document describes, among other things, various implementations of an automatic pairing between wireless electronic devices and an in-vehicle entertainment system.

In one aspect, an apparatus for assisting a pairing operation is provided. The apparatus comprises: a processor included in an intermediate device in communication with a source device to which a wireless electronic device is to be wirelessly connected through the pairing operation; and a storage included in the intermediate device and in communication with the processor, the storage configured to store pairing information of the wireless electronic device, the pairing information including a profile of the wireless electronic device that enables to complete the pairing operation with the source device. The storage further stores instructions, upon being executed, to instruct the processor to: determine to initiate the pairing operation for the wireless electronic device; and provide the pairing information of the wireless electronic device to the source device such that a wireless communication link is established between the wireless electronic device and the source device based on the pairing information of the wireless electronic device.

In another aspect, a method for pairing a wireless electronic device to an in-vehicle entertainment system disposed on a passenger vehicle is provided. The method comprises: determining, by a passenger electronic device on a passenger vehicle and having a wireless connection with the wireless electronic device, to initiate a pairing operation for pairing the wireless electronic device to the in-vehicle entertainment system; and providing, by the passenger electronic device to the in-vehicle entertainment system, pairing information of the wireless electronic device stored in the passenger electronic device, the pairing information of the wireless electronic device including a profile of the wireless electronic device that enables to complete the pairing operation, thereby establishing a wireless communication link between the wireless electronic device and the in-vehicle entertainment system based on the pairing information of the wireless electronic device.

In another aspect, an apparatus for providing contents to electronic devices in a passenger vehicle is provided. The apparatus comprises: a processor included in a source device and configured with processor-executable instructions to: receive, from a first electronic device having a wireless connection with a second electronic device, a request to proceed a pairing operation for the second electronic device; receive, from the first electronic device, pairing information of the second electronic device, the pairing information of the second electronic device including a profile of the second electronic device that enables to complete the pairing operation such that a wireless communication link is established between the wireless electronic device and the source device based on the pairing information of the wireless electronic device; and provide, by the source device to the second electronic device, contents over the wireless communication link.

The above and other aspects and their implementations are described in greater detail in the drawings, the description, and the claims.

DETAILED DESCRIPTION

Recent advances in wireless technologies have made wireless connection services such as on-board WiFi and Bluetooth connections available during travel in a commercial passenger vehicle. Unlike the past when a passenger was not provided with wireless connection services onboard during travel, onboard wireless connection services are available in many commercial vehicles and passengers are able to enjoy wireless connections during a travel in a commercial passenger vehicle. In addition, as most travelers carry their own devices including PEDs (personal electronic devices) and other wireless electronic devices, which have wireless communication capability, there are more demands from passengers to have access to an in-vehicle entertainment system through their own devices. The wireless communication technologies provide standards as to how to connect and exchange information between electronic devices. To allow a passenger's device to wirelessly access to the in-vehicle entertainment system, a pairing process needs to be accomplished. Pairing, sometimes known as bonding, is a process that helps set up an initial linkage between devices to allow wireless communications between the devices.

Various implementations of the disclosed technology provide techniques for simplifying a process for pairing a passenger's device in a commercial passenger vehicle to an in-vehicle entertainment system. In the conventional art, a passenger who becomes onboard needs to go through the pairing process for pairing their device to the in-vehicle entertainment system. Each commercial passenger vehicle has its own entertainment systems and thus locating the right menu to initiate the pairing process onboard could be challenging. Also, when there are multiple devices that a passenger wishes to pair to the IFE system, this pairing process can become cumbersome by making the passenger repeat the pairing process multiple times to connect the multiple devices to the IFE system. When there are requests for multiple pairing operations from each passenger to connect their devices to the in-vehicle entertainment system, the undesired signal interferences can be caused, which makes the pairing operations unsuccessful and lead to another try for the pairing operation.

The technical solutions described in this patent document are provided to simplify a pairing process for establishing wireless connections between a passenger's device and an in-vehicle entertainment system that offers a wide variety of multimedia content for passengers on board. With the disclosed techniques for pairing passenger devices to the in-vehicle entertainment system, a pairing process can be automatically processed by executing a pairing support software application. In some implementations, multiple passenger devices can be paired to the in-vehicle entertainment system without the need to initiate multiple pairing operations for each of the multiple passenger devices, thereby preventing unnecessary signal interruptions among multiple pairing operations and improving passenger experience during the trip. Various implementations will be discussed in detail with reference to the figures below. In the description, an airplane is described as an example of the passenger vehicle, but the implementations of the disclosed technology can be applicable to other passenger vehicles such as buses, trains, ships, and other types of commercial passenger vehicles.

Figure 1:
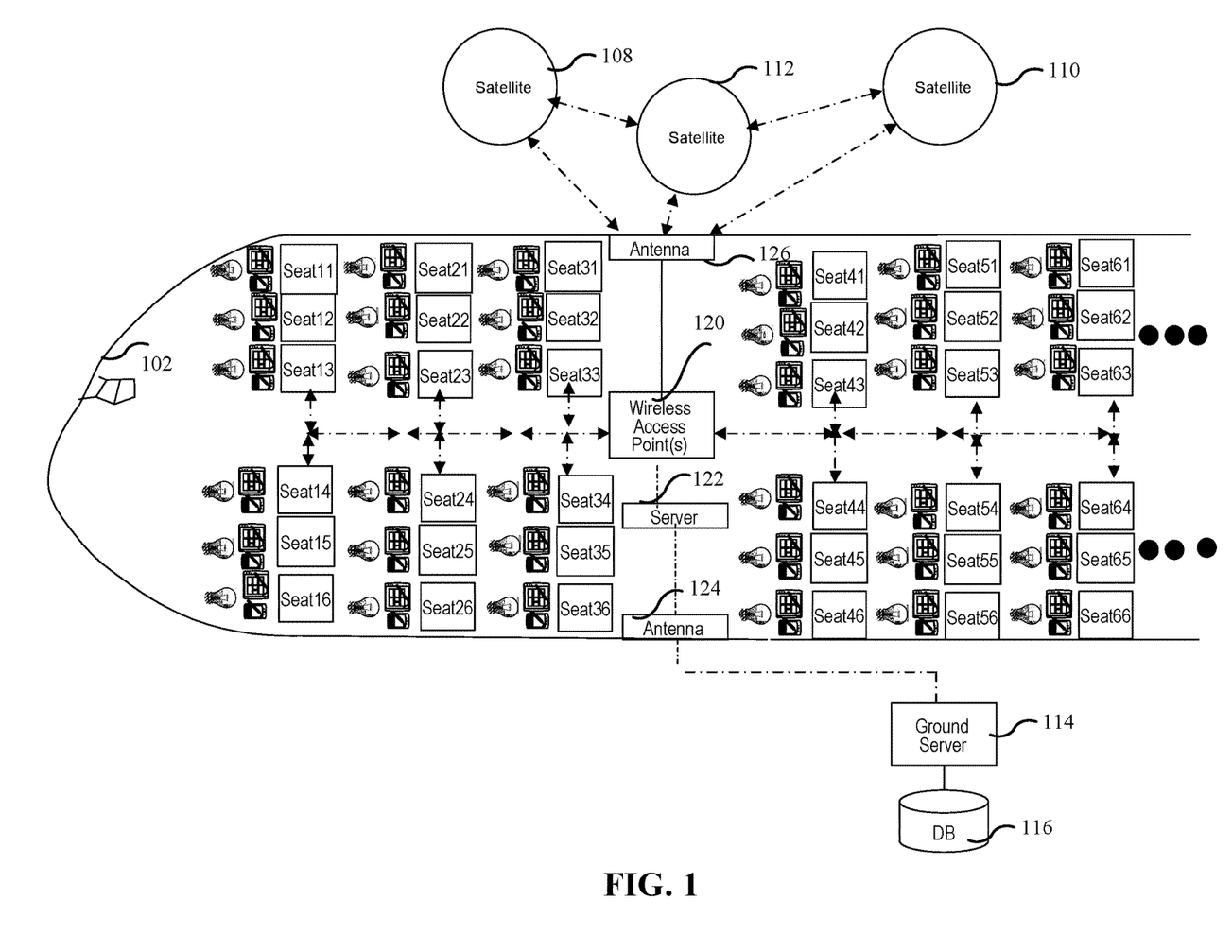
FIG. 1 shows an example of an in-flight entertainment (IFE) system installed in an airplane based on some implementations of the disclosed technology.

FIG. 1 shows an example of an in-flight entertainment (IFE) system installed in an airplane 102. The IFE system provides various entertainment and connectivity services to passengers on board. Referring to FIG. 1, the IFE system includes a server 122, antenna 126, and antenna 124. The components shown as a single element in FIG. 1 (e.g., the server 122, the wireless access point 120, etc.) can be configured in multiple elements. For example, the in-flight service system can include multiple wireless access points to facilitate or support providing of wireless coverages for the passengers.

The passengers carry their own devices, which include the PEDs (illustrated by the light bulb icon in FIG. 1) and other wireless electronic devices. The PEDs may refer to any electronic computing device that includes one or more processors or circuitries for implementing the functions related to data storage, video and audio streaming, wired communications, wireless communications, etc. The examples of the PEDs include cellular phones, smart phones, tablet computers, laptop computers, and other portable computing devices. In the implementations of the disclosed technology, the PEDs may have the capability to execute application software programs ("apps") to perform various functions. For example, the PED includes a pairing support software application to support the pairing operations as suggested in this patent application. The pairing support software application is configured to program the PED to perform the required functionalities and operations of the PED as will be further described with reference to FIGS. 5 and 8. The wireless electronic devices may refer to any electronic device that uses a radio frequency (RF) technologies and includes a processor or circuitry for implementing the wireless technology protocols, (e.g., Bluetooth). Examples of the wireless electronic devices include headphones, remote controllers, digital watches, earplugs, microphones, etc.

In FIG. 1, the airplane 102 is depicted to include multiple passenger seats, Seat 11 to Seat 66. The media playback devices (illustrated by screen icon) are provided at each passenger seat and configured with capabilities for video and audio streaming, Internet communications, and other capabilities. In some implementations, the media playback devices are provided at each passenger seat, such as located at each of the seatbacks of the passenger seats, and/or on cabin walls and/or deployable from an armrest for seats located at a bulkhead (i.e., in the first row of a section). The media playback devices have displays providing interfaces to each passenger through which each passenger enters their selections on the entertainment option, the particular selections, emergency requests, etc. Upon receiving the selection from the passengers, based on the selections from the passengers, the media playback device displays entertainment contents and travel information.

The server 122 is communicably coupled with media playback devices and the PEDs. The communications between the server 122 and the passengers' onboard devices including the media playback devices and the PEDs are either realized by wired connections or wireless connections. In some implementations, the communication among the server 122, the media playback devices 104, and the PEDs 112 are achieved through the antenna 124 to and from the ground-based cell towers by, for example, a provision of network plugs at the seat for plugging PEDs to a wired onboard local area network. In some other implementations, the communications among the server 122, the media playback devices, and the PEDs are achieved through the antenna 126 to and from satellites 108, 110, 112 in an orbit (e.g., via a cellular network utilizing one or more onboard base station(s), Wi-Fi utilizing the wireless access point 120, and/or Bluetooth). The server 122, the media playback devices, and the PEDs form a local network onboard the airplane 102 through an on-board router (not shown). The server 122 is also communicably coupled with the ground server 114 through the antenna 126 for receiving and transmitting information from/to the ground server 114. The ground server 114 may be in communication with the database 116, and provide information from the database 116 to the server 122 and store information received from the server 122 in the database 116. Although FIG. 1 shows that the database 116 is provided separately from the ground server 114, the database 116 can be provided as a part of the ground server 114.

Although not shown in FIG. 1, the IFE system may further include a database which stores passenger information, for example, profiles of the passengers (name, age, etc.), preferred entertainment options (movies, music, shows, etc.), preferred entertainment content (e.g., genres of movies), etc.

The passenger information can be obtained in multiple manners and is stored in the database of the IFE system. In some implementations, the passenger information is obtained prior to the passengers coming on board (e.g., at the time of purchasing the tickets or checking in for the flights), or at other times. In some implementations, the passenger information can be obtained and shared by an association of several airplane companies and retrieved from the database 116. In some implementations, as discussed later in this patent document, the passenger information can be updated during the trip based on the data about viewing history during the trip.

Figure 2:
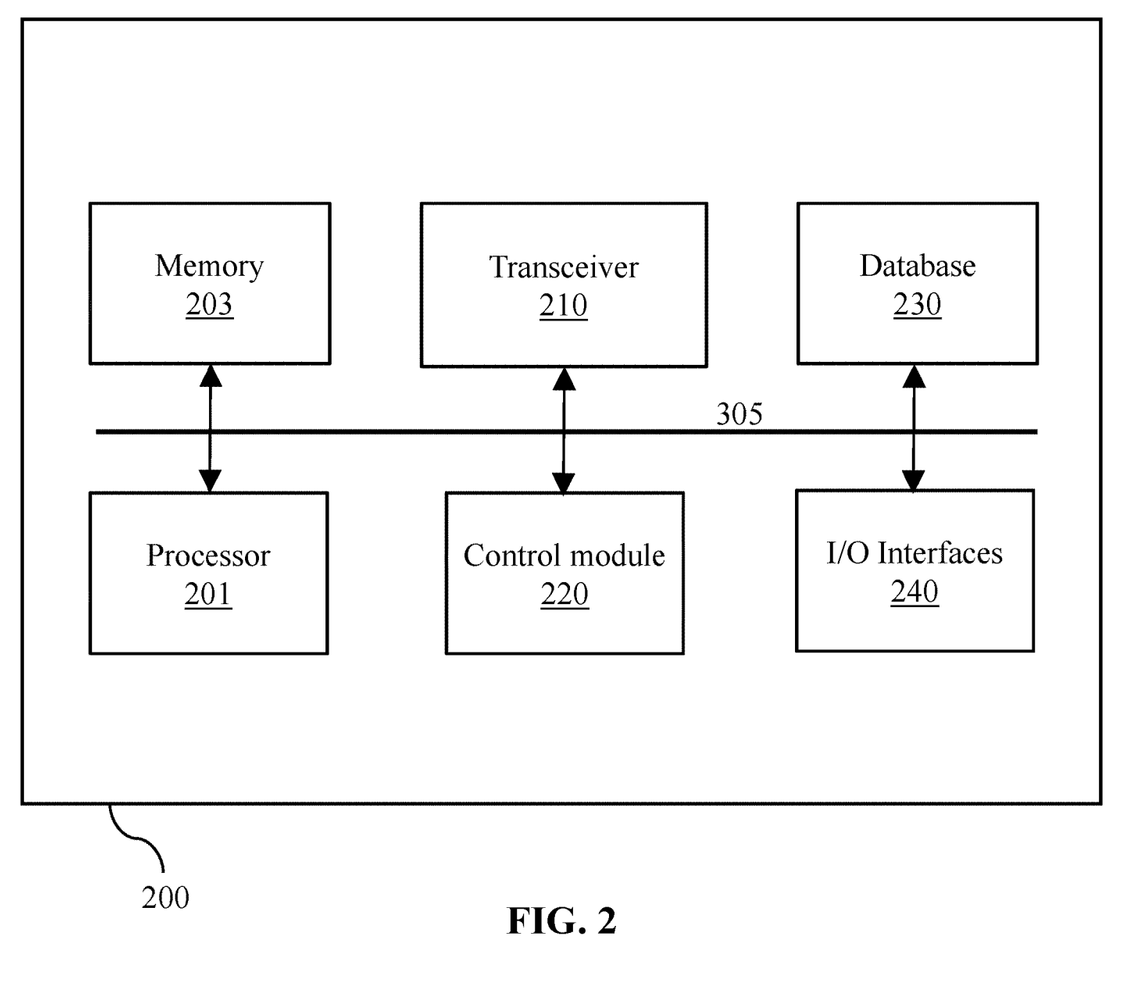
FIG. 2 shows an example block diagram of a computing device based on some implementations of the disclosed technology.

FIG. 2 shows an example block diagram of a computing device (e.g., an onboard server, a PED, or a ground server) based on some implementations of the disclosed technology. The computing device 200 includes at least one processor 201, a memory 203, a transceiver 210, a control module 220, a database 230, and an I/O (input/output) interface 240. In other embodiments, additional, fewer, and/or different elements may be used to configure the computing device 800. The memory 203 may store instructions and applications to be executed by the processor 201. The memory 203 is an electronic holding place or storage for information or instructions so that the information or instructions can be accessed by the processor 201. The memory 203 can include, but is not limited to, any type of random access memory (RAM), any type of read only memory (ROM), any type of flash memory, such as magnetic storage devices (e.g., hard disk, floppy disk, magnetic strips, etc.), optical disks (e.g., compact disc (CD), digital versatile discs (DVD), etc.), smart cards, flash memory devices, etc. The instructions upon execution by the processor 201 configure the computing device 200 to perform the operations (e.g., the operations as shown in FIG. 5, 7, 9 or 10) which will be described in this patent document. The instructions executed by the processor 201 may be carried out by a special purpose computer, logic circuits, or hardware circuits. The processor 201 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 201 can perform the operations called for by that instruction.

The processor 201 operably couples with the memory 203, the transceiver 210, the control module 220, the database 230, and the I/O interface 240, to receive, send, and process information and to control the operations of the computing device 200. The processor 201 may retrieve a set of instructions from a permanent memory device, such as a ROM device, and copy the instructions in an executable form to a temporary memory device that is generally some form of RAM. In some implementations, the computing device 200 can include a plurality of processors that use the same or a different processing technology. The transceiver 210 may include a transmitter and a receiver. In some embodiments, the device 200 comprises a transmitter and a receiver that are separate from another but functionally form a transceiver. The transceiver 210 transmits or sends information or data to another device (e.g., another server, a PED, etc.) and receives information or data transmitted or sent by another device (e.g., another server, a PED, etc.).

The control module 220 of the computing device 200 is configured to perform operations to assist the computing device 200. In some implementations, the control module 220 can be configured as a part of the processor 201. When the computing device 200 corresponds to the IFE system as shown in FIG. 1, the control module 220 can be included in the airplane 102. In some implementations, the control module 220 can operate machine learning/artificial intelligence (AI) applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control module 220 may assist the computing device 200 to perceive their environment and take actions that maximize the effectiveness of the operations performed by the computing device 200.

The I/O interfaces 240 enable data to be provided to the computing device 200 as input and enable the device computing 200 to provide data as output. In some embodiments, the I/O interfaces 240 may enable user input to be obtained and received by the computing device 200 (e.g., via a touch-screen display, buttons, switches) and may enable the computing device 200 to display information. In some embodiments, devices, including touch-screen displays, buttons, controllers, audio speakers, or the like, are connected to the computing device 200 via I/O interfaces 240.

In the implementations of the disclosed technology, an automatic paring between a wireless electronic device and an in-vehicle entertainment system is performed through a PED. According to various implementations of the disclosed technology, when the wireless electronic device is paired to the PED, the PED can initiate the pairing operation for pairing the wireless electronic device to the IFE system on behalf of the wireless electronic device. In the description below, Bluetooth, which is an open standard for short-range radio frequency (RF) communication, is mentioned as an example of a communication protocol which allows the devices to be wirelessly connected through a pairing operation but the disclosed technology can be also applied to any other short-range RF technologies.

Figure 3:
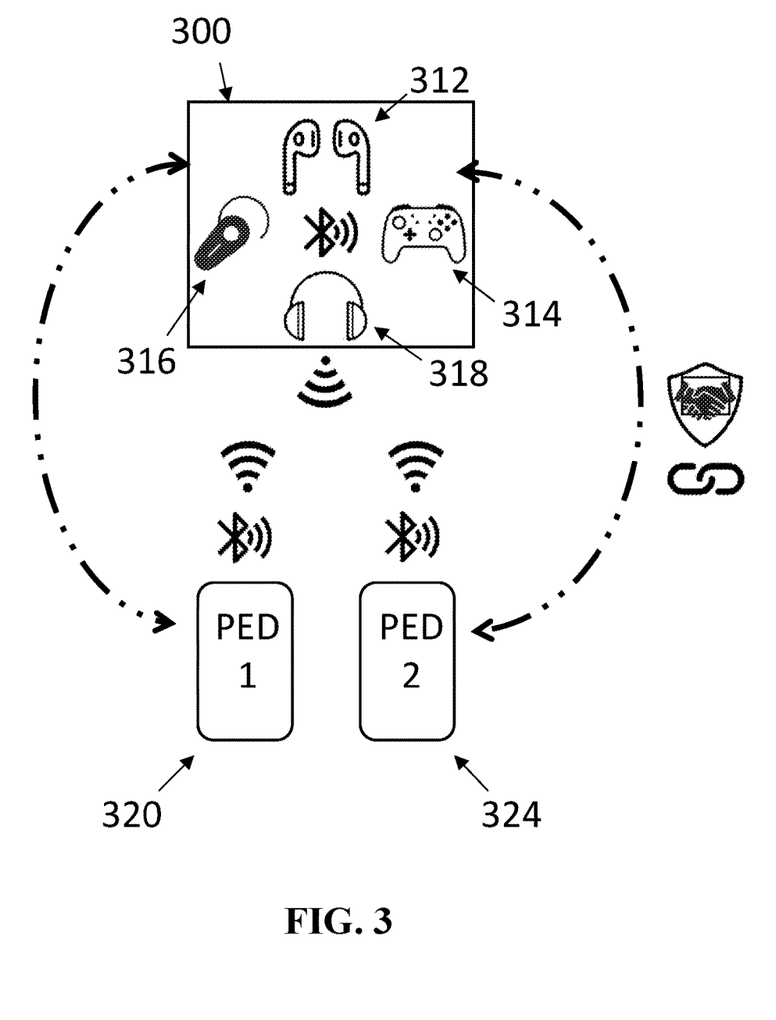
FIG. 3 shows an example diagram illustrating wireless electronic devices and PEDs that are paired to each other based on some implementations of the disclosed technology.

FIG. 3 shows an example diagram illustrating wireless electronic devices and PEDs that are paired to each other based on some implementations of the disclosed technology. In the example of FIG. 3, a wireless electronic device 300 can be at least one of a headphone 318, an earplug 312, a remote controller 314, or a microphone 316. A passenger onboard can have one or more wireless electronic devices paired to his or her PED. The wireless electronic devices 312, 314, 316, and 318 and the PEDs 320 and 324 can be wireless connected to each other over various communication protocols such as WiFi, Bluetooth, etc. The pairing between the wireless electronic devices and his or her PED allows those devices to be wireless connected through each other over a particular communication protocol such Bluetooth. FIG. 3 illustrates two PEDs 320 and 324 belonging to two passengers as the example, and the description below is provided for the case that each of the PEDs 320 and 324 is paired to one wireless electronic device 310. Those skilled in the art can understand that the number of PEDs and the number of wireless electronic devices 300 paired to the corresponding PED can be varied. For example, one passenger can have multiple PEDs, each PED paired to one or more wireless electronic devices 300. In some implementations, one passenger has one PED paired to multiple wireless electronic devices 300 (e.g., the headphone 318 and the remote controller 314 paired to PED 320). In some implementations, the number of PEDs and the number of wireless electronic devices, which are to be paired to the IFE system, will be determined based on the available resources to support wireless connectivity for the passengers.

To pair the wireless electronic devices 300 to the PEDs 320 or 324, a "trust relationship" needs to be established between the PED 320 or 324 and the wireless electronic devices 300. To establish the trust relationship between the PED 320 or 324 and the wireless electronic devices 300, user authentication is required for privacy issues. Once the trust relationship is established, it refers to the state that the corresponding devices (PED 320 or 324) and the wireless electronic devices 300 are able to communicate without having to go through any additional authentication process. In some implementations, the trust relationship between the PED 320 or 324 and the wireless electronic devices 300 is established during the pairing process. Once the pairing process is successfully completed between the PED 320 or 324 and the wireless electronic devices 300, the PED 320 or 324 and the wireless electronic devices 300 are allowed to be connected to each other through wireless communications (e.g., Bluetooth) for exchanging information and operate interactively with one another.

This pairing process between the wireless electronic device 300 and the PED 320 or 324 may require the passenger to input a code or number into the wireless electronic devices and/or the PED 320 or 324. When a trust relationship between the wireless electronic device 300 and the PED 320 or 324 is established and the operation of pairing the wireless electronic device 300 to the PED 320 or 324 is completed, such wireless electronic device may be referred to as active wireless electronic devices. For example, when the headphone 318 corresponds to the active wireless electronic device, the audio playback can be played by being wireless connected to the PED and when the remote controller 314 corresponds to the active wireless electronic device, a command can be executed on the PED by the wireless connection between the PED and the remote controller 314.

In some implementations, the pairing process between the wireless electronic device 300 and the PED 320 or 324 can be triggered by a specific request from the passenger (e.g., when the passenger presses the menu in their PED to add the wireless electronic devices) or may be triggered automatically (e.g., when connecting to a service). For example, the wireless electronic device 300 can automatically initiate the pairing operations when the wireless electronic devices are powered or certain conditions are met (e.g., a change of a distance from a wireless electronic device). Once the pairing is completed, pairing information relating to the wireless electronic devices 300 is stored in the PED 320 or 324. In some implementations, this pairing information may include a profile of the corresponding wireless electronic device, which is useful for authenticating the wireless electronic device and/or establishing a Bluetooth communications link. The profile of the active wireless electronic device 300 paired to the PED 320 or 324 is encrypted and stored in the PED 320 or 324 and can be utilized for another pairing process as will be discussed later in this patent document.

Figure 4:
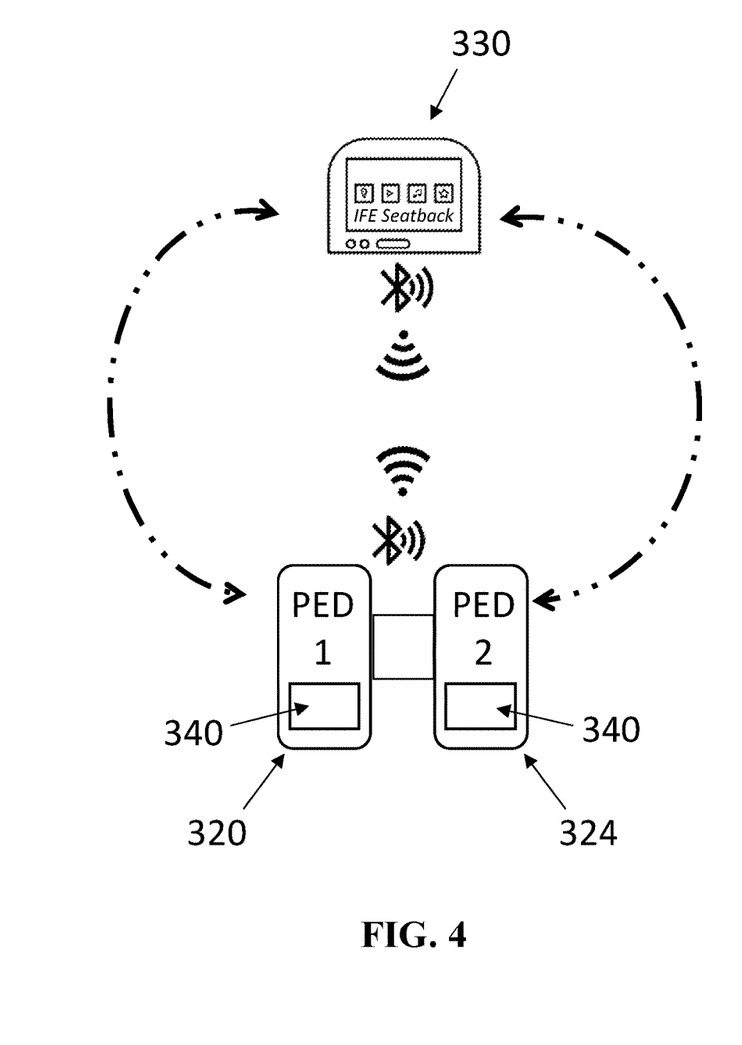
FIG. 4 shows an example diagram illustrating an IFE system and PEDs that are paired to each other based on some implementations of the disclosed technology.

FIG. 4 shows an example diagram illustrating an IFE system and PEDs that are paired to each other based on some implementations of the disclosed technology. The IFE seatback device 330 is shown in FIG. 4 as a component of the IFE system. The IFE seatback device 330 may correspond to a media playback device of the IFE system as discussed in relation to FIG. 1.

Although now shown in FIG. 4, the PEDs 320 and 324 have the corresponding wireless electronic devices which have been paired thereto as discussed with regard to FIG. 3. In the implementations of the disclosed technology, each of the PEDs 320 and 324 has a pairing support software application 340 installed thereon. The passengers may install the pairing support software application 340 either before or after coming onboard to use the pairing services supported by the software application. The pairing support software application may include computer program codes for carrying out operations described with various implementations of the disclosed technology, which can be written in any combination of one or more programming languages, including object-oriented programming languages, procedural programming languages, dynamic programming languages, or other programming languages.

In the implementations of the disclosed technology, by executing the pairing support software application 340 on the PEDs 320 and 324, the pairing process for pairing the PEDs 320 and 324 to the IFE system automatically proceeds such that the trust relationship is established between the PEDs 320 and 324 and the IFE system 330. Thus, the pairing support software application simplifies the pairing operations for the PEDs 320 and 324 by skipping a passenger's manual operations for pairing the PEDs 320 and 324 to the IFE system. In the conventional art, to pair the PEDs to the IFE system, the passengers had to look through the menus of the IFE seatback device to initiate the pairing processes. In addition, after initiating the pairing process, depending on the interfaces, the passengers had to enter additional information such as authentication codes, sequences, etc. Such manual processes might introduce opportunities for passenger error. Unlike the conventional manner that requires separate pairing processes initiated by the passengers, in the implementations of the disclosed technology, the pairing process for establishing the wireless connection between the PEDs 320 and 324 and the IFE system can be initiated by executing the pairing support software application. The pairing support software application is built such that it detects the pairing information (e.g., the profile) of the PEDs on which the pairing support software application is installed and makes a request to proceed with the pairing process for connecting the PEDs 320 and 324 to the IFE system using the pairing information.

Once the PEDs 320 and 324 are connected to the IFE system, various implementations of the disclosed technology proceed with pairing operations for pairing one or more wireless electronic devices to the IFE system. In various implementations of the disclosed technology, with the pairing support software application installed and executed on the PEDs 320 and 324, the PEDs 320 and 340 further proceed with the operation for pairing the active wireless electronic devices 300 paired to the corresponding PEDs 320 and 324 to the IFE system on behalf of the wireless electronic devices 300. In the conventional art, to connect the wireless electronic device to the IFE system, regardless of whether the passenger has the PED 320 or 324 which has been already paired to the wireless electronic device and the IFE system, the passenger needs to perform the pairing operation for wirelessly connecting the wireless electronic device to the IFE system separately from the pairing operation for wirelessly connecting the PED to the IFE system. This separate pairing operation for the wireless electronic device and the PED was accomplished directly between the wireless electronic device and the PED and caused inconveniences and was time consuming. Especially, these inconveniences can be more problematic since when there are multiple wireless electronic devices that the passenger wants to pair to the IFE system, the passenger needs to repeat the pairing process for each wireless electronic device, which requires more time and efforts and may end up degrading the passenger experience during the trip. In recognition of the above issues, the implementations of the disclosed technology suggests techniques to alleviate such inconveniences that can be caused by repeatedly performing the pairing process for each wireless electronic device, by making the request for the pairing operation directly from the wireless electronic device.

Figure 5:
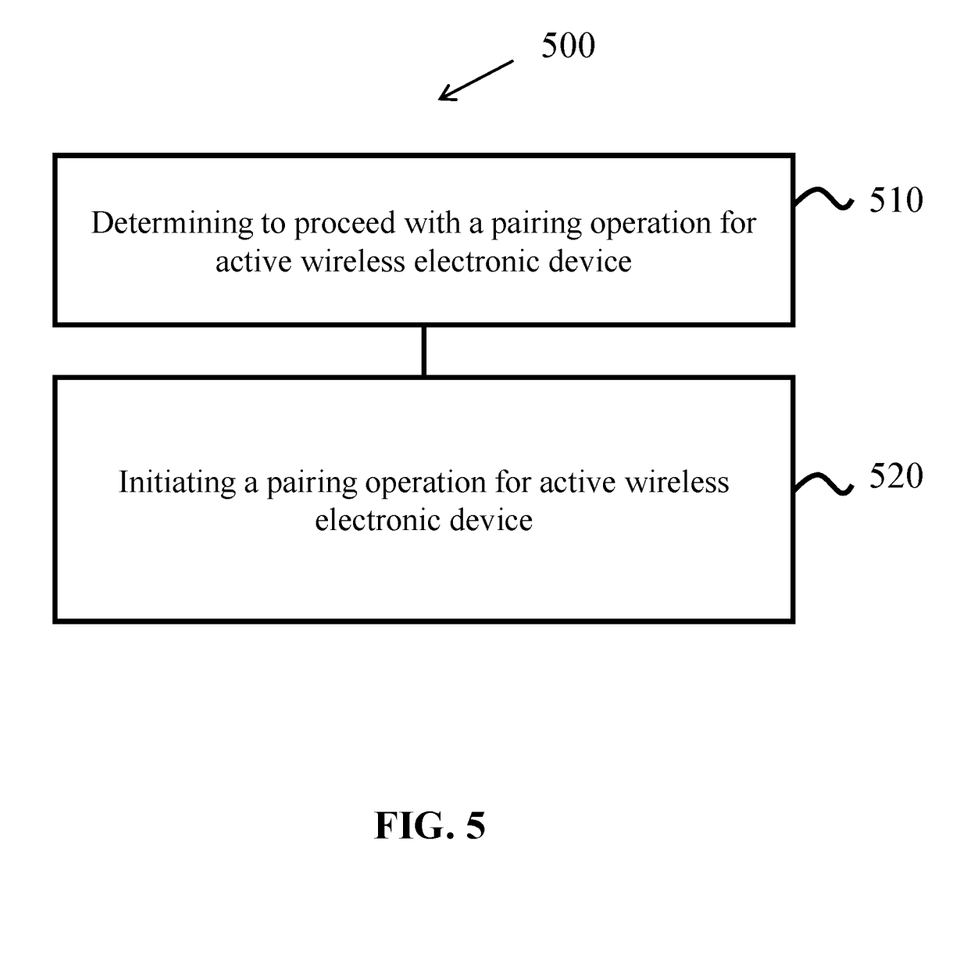
FIG. 5 shows an example flowchart of operations that are performed by a pairing support software application based on some implementations of the disclosed technology.

FIG. 5 shows an example flowchart of operations that are performed by executing a pairing support software application installed on the PED 320 or 324 based on some implementations of the disclosed technology. The operations as shown in FIG. 5 proceed after a pairing between the PED 320 or 324 and the IFE system is completed, as shown in FIG. 4.

In the operation 510, the pairing support software application determines to proceed a pairing operation for any active wireless electronic device on behalf of the active wireless electronic devices. In some implementations, the pairing support software application installed on the PED 320 or 324 has logics that can detect any active wireless electronic device paired to the PED 320 or 324. In the example, the pairing support software application may determine that there is an active wireless electronic device paired to the PED 320 or 324 when the pairing information of that wireless electronic device is stored on the PED 320 or 324. In the example, the pairing support software application may determine that no active wireless electronic device exists when there is no pairing information of any wireless electronic device stored on the PED 320 or 324. In some implementations, when the active wireless electronic device wirelessly connected to the PED 320 or 324 is detected, the paring support software application determines to proceed with a paring operation for paring the detected active wireless electronic device. In some other implementations, in addition to the detection of the active wireless electronic device, the pairing support software application further requires a confirmation from a passenger to proceed with the pairing operation for the wireless electronic device. In this case, the pairing support software application can request a passenger for a confirmation to proceed with a pairing operation for an active wireless electronic device. Providing such request for the confirmation and receiving the confirmation can be implemented in various manners, for example, by exchanging visual messages on a display on the PED 320 or 324.

Figure 6:
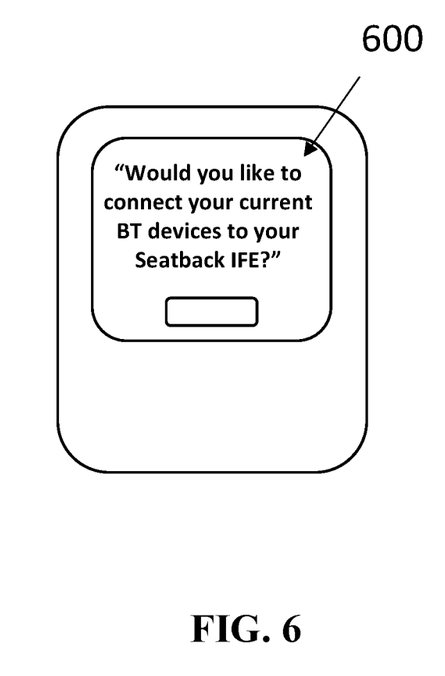
FIG. 6 shows an example screen provided to a PED to check whether a passenger agrees to proceed with an additional pairing operation for any active wireless electronic device based on some implementations of the disclosed technology.

FIG. 6 shows an example of a display including a message provided to a PED to check whether a passenger agrees to proceed with the pairing operation for any active wireless electronic device. In the example as shown in FIG. 6, the pairing support software application prompts a message 600, "Would you like to connect your current BT (Bluetooth) devices to your Seatback IFE?" to check whether the passenger agrees to proceed with the pairing process for the wireless electronic device paired to the PED 320 or 324. Once the passenger responds "Yes," the pairing support software application proceeds to operation 520 to perform the additional pairing process for the active wireless electronic device. In this implementation, since the additional pairing of the wireless electronic device to the IFE system proceeds after checking with the passenger, unnecessary pairing can be prevented.

Figure 7:
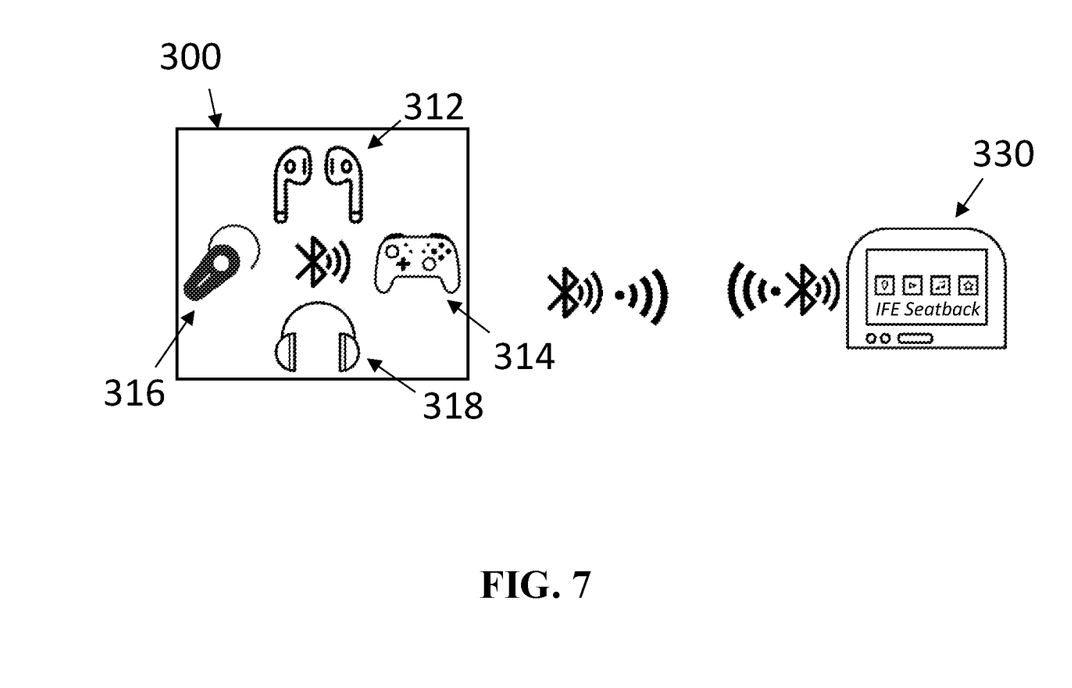
FIG. 7 shows an example diagram illustrating wireless electronic devices and an IFE system that are paired to each other based on some implementations of the disclosed technology.

By referring back to FIG. 5, in operation 520, the pairing operation for the active wireless electronic device is initiated. The initiating of the pairing operation for the active wireless electronic device paired to the PED 320 or 324 to the IFE system may include providing the pairing information of the active wireless electronic device stored on the PED 320 or 324 to the IFE system. The pairing information of the wireless electronic device has been stored in a storage of the PED 320 or 324 through the operation for pairing the wireless electronic device to the PED 320 or 324 (see FIG. 3). The PED 320 or 324 provides the stored pairing information of the active wireless electronic device to the IFE system to complete the pairing process for establishing the connection between the active wireless electronic device and the IFE system. When the pairing operation is completed, the active wireless electronic device 300 is wirelessly connected to the IFE system 330 as shown in FIG. 7.

In this implementation, the pairing operation for the wireless electronic device 300 is performed through the pairing support software application executing on the PED 320 or 324 without any direct request from the wireless electronic device for the pairing operation. In addition, the pairing operation pairing the PEDs 320 and 324 and the wireless electronic devices 300 can be completed in a single user step by executing a pairing support software application. Thus, the pairing process for connecting the PEDs and the wireless electronic devices can be much more simplified without requiring the passenger's manual operation to initiate the pairing process for the wireless electronic device. After the pairing operation for pairing the active wireless electronic device to the IFE system is completed, the wireless connection between the wireless electronic device 300 and the IFE system is established, which allows the passenger to enjoy various contents using their wireless electronic device. Once the wireless electronic device is wirelessly connected to the IFE system, various contents can be exchanged through the connection over the wireless connection and this wireless connection between the wireless electronic device and the IFE system will be not interrupted by closing the pairing support software application.

In some implementations, the pairing support software application determines that multiple active wireless electronic devices are paired to the IFE system. In the example, the pairing support software application determines that profiles of the multiple wireless electronic devices are stored on the PED 320 or 324. In this case, the pairing support software application may prompt a message to allow the passenger to select any one or more of the multiple wireless electronic devices that the passenger wishes to pair to the IFE system. In some implementations, if the passenger selects the multiple wireless electronic devices for the pairing operation with the IFE system, the pairing support software application may proceed with the pairing operation according to various manners. For example, the pairing support software application may receive, from the passenger, a preferred order for pairing the wireless electronic devices, and can perform the pairing operation according to the preferred order. In another example, the pairing support software application runs the algorithm that evaluates the available bandwidth for the pairing operation and makes the selection as to how to perform the pairing operation based on the evaluation. If the evaluation shows that there is not enough bandwidth for connecting all of the multiple wireless electronic devices, the pairing support software application can select one among the multiple wireless electronic devices to be paired to the IFE system based on the evaluation.

Figure 8:
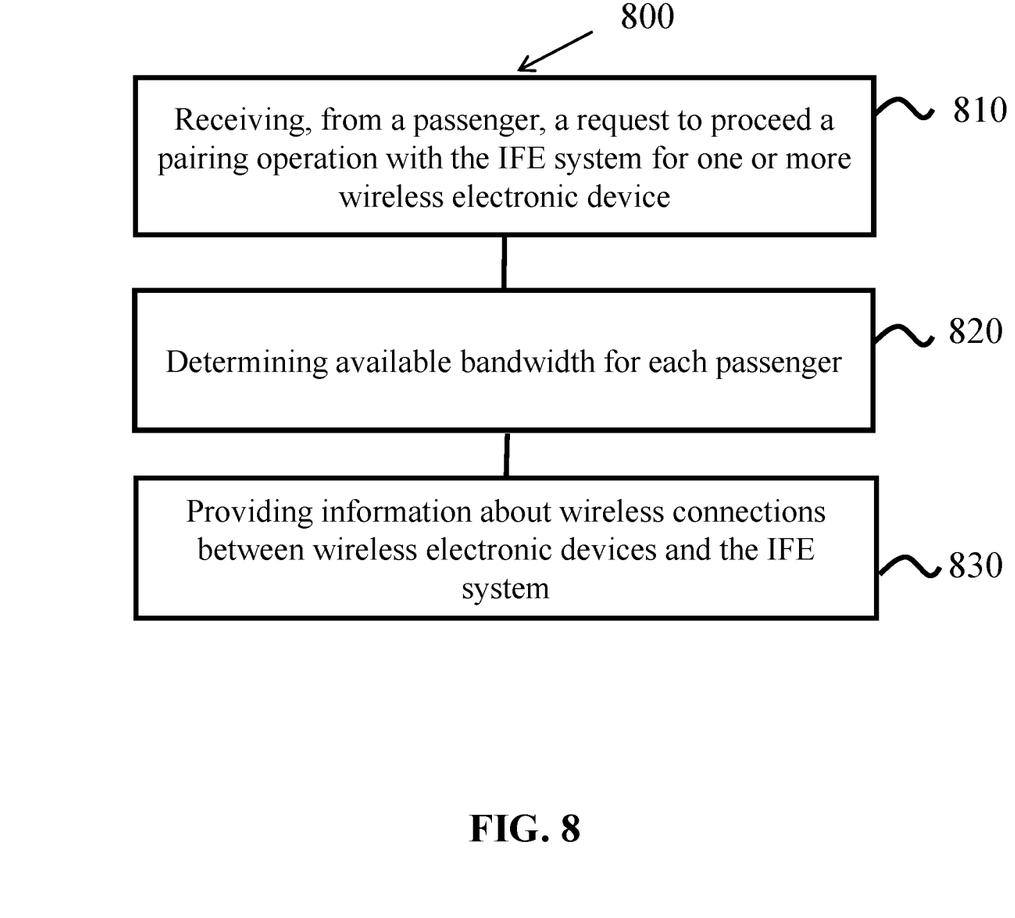
FIG. 8 shows an example flowchart of operations that are performed by a pairing support software application based on some implementations of the disclosed technology.

FIG. 8 shows an example flowchart of operations that are performed by a pairing support software application based on some implementations of the disclosed technology. The operations as shown in FIG. 8 proceed after an onboard passenger executes a pairing support software application. In some implementations, at least one of the operations as shown in FIG. 8 can be provided in combination with the implementations discussed above. In some other implementations, the operations as shown in FIG. 8 can be provided as another example of the pairing support software application.

In operation 810, the pairing support software application receives, from a passenger, a request to perform a pairing operation for pairing one or more wireless electronic devices to the IFE system. Such request can be obtained by communicating with the passengers through the messages prompted by the pairing support software application being executed on the PED. The passenger may provide, to the pairing support software application, information about for which wireless electronic device(s) for which they want to proceed with the pairing operation. In operation 820, the pairing support software application determines available bandwidth for each passenger. For example, the pairing support software application runs the algorithm to determine the available bandwidth for each passenger for an additional pairing operation based on the number of PED devices, radio signal characteristics supported by the IFE system, the amount of requests for additional pairing operations, the amount of data currently being used by the passengers, etc. In some implementations, the pairing support software application may have logics to monitor the use of radio signals onboard.

In operation 830, the pairing support software application provides information about wireless connections to be established between wireless electronic devices and the IFE system. For example, the pairing support software application provides information that includes data types (photos, audio, video, etc.), the number of wired/wireless electronic devices, and wireless connection types (e.g., Bluetooth or other short-range RF communications) which can be supported when the wireless connection is established between the wireless electronic devices and the IFE system. In some implementations, the pairing support software application provides the information about the wireless connections with visual indications. For example, the pairing support software application provides the information with several different colors (e.g., green, yellow, red, purple) indicating different qualities (e.g., Good, Okay, Poor, Unsupported) of the wireless connections. In some implementations, the pairing support software application provides information showing the estimated qualities for different combinations of wireless electronic devices. In some implementations, the pairing support software application provides information showing the estimated qualities for different combinations of selections of the data types to be exchanged over the wireless electronic devices. Based on the information provided by the pairing support software application, the passenger can have a better understanding about possible connection qualities and supported data types and determine which wireless devices he or she wants to connect to the IFE system and/or which types of data he or she wants to exchange over the connections.

Figure 9:
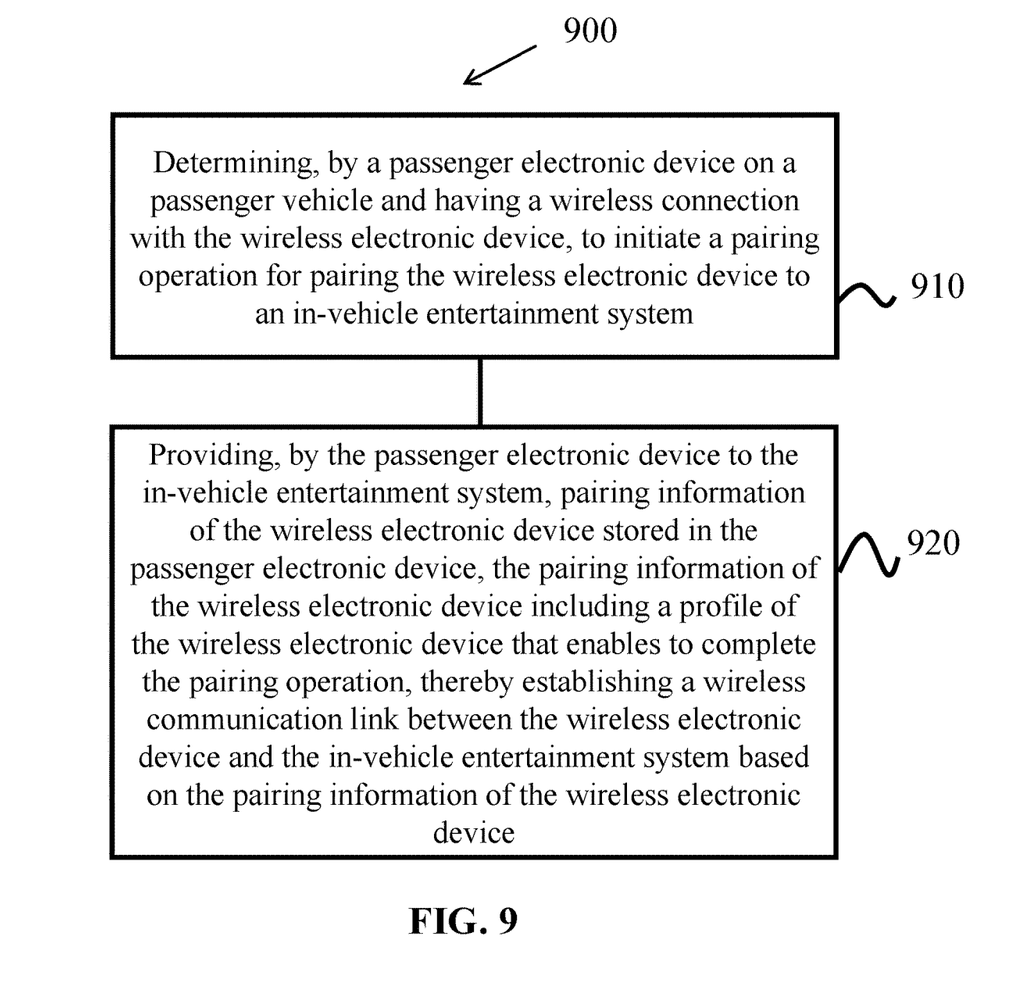
FIG. 9 is an example flowchart of a method for pairing a wireless electronic device to an in-vehicle entertainment system disposed on a passenger vehicle based on some implementations of the disclosed technology.

FIG. 9 is an example flowchart of a method for pairing a wireless electronic device to an in-vehicle entertainment system disposed on a passenger vehicle based on some implementations of the disclosed technology. The method 900 includes, at operation 910, determining, by a passenger electronic device on a passenger vehicle and having a wireless connection with the wireless electronic device, to initiate a pairing operation for pairing the wireless electronic device to the in-vehicle entertainment system. The method 900 further includes, at operation 920, providing, by the passenger electronic device to the in-vehicle entertainment system, pairing information of the wireless electronic device stored in the passenger electronic device, the pairing information of the wireless electronic device including a profile of the wireless electronic device that enables to complete the pairing operation, thereby establishing a wireless communication link between the wireless electronic device and the in-vehicle entertainment system based on the pairing information of the wireless electronic device.

In some implementations, the method further includes receiving, by the passenger electronic device and from the wireless electronic device, a request to perform a pairing operation for establishing the wireless connection between the wireless electronic device and the passenger electronic device; and receiving the pairing information of the wireless electronic device of the wireless electronic device through the pairing operation between the wireless electronic device and the passenger electronic device. In some implementations, the determining to initiate the pairing operation further includes transmitting a message requesting for a confirmation to initiate the pairing operation on behalf of the wireless electronic device; and receiving the confirmation to initiate the pairing operation for pairing the wireless electronic device to the in-vehicle entertainment system. In some implementations, the determining to initiate the pairing operation further includes: detecting the wireless electronic device having the wireless connection with the passenger electronic device. In some implementations, the method further comprises: determining to initiate the pairing operation for another wireless electronic device to the in-vehicle entertainment system, the another wireless electronic device has the wireless connection with the passenger electronic device and pairing information of the another wireless electronic device stored in the passenger electronic device. In some implementations, the determining step and the providing step are performed by executing a software application installed on the passenger electronic device. In some implementations, the method further comprises providing information that includes at least one of available wireless connection types for the wireless communication link or data types exchangeable over the wireless communication link.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Various techniques preferably incorporated within some embodiments may provide an apparatus for assisting a pairing operation. The apparatus comprises: a processor included in an intermediate device in communication with a source device to which a wireless electronic device is to be wirelessly connected through the pairing operation; and a storage included in the intermediate device and in communication with the processor, the storage configured to store pairing information of the wireless electronic device, the pairing information including a profile of the wireless electronic device that enables to complete the pairing operation with the source device, wherein the storage further stores instructions, upon being executed, to instruct the processor to: determine to initiate the pairing operation for the wireless electronic device; and provide the pairing information of the wireless electronic device to the source device such that a wireless communication link is established between the wireless electronic device and the source device based on the pairing information of the wireless electronic device. The intermediate device, the sourced device, and the wireless electronic device may correspond to a PED, an IFE system, and a wireless electronic device, which are discussed with the implementations as shown in FIGS. 3-8.

In some implementations, the processor is configured to detect the wireless electronic device wirelessly connected to the intermediate device by locating the pairing information of the wireless electronic device in the storage. In some implementations, the processor is further configured to provide a message to request for a confirmation to initiate the pairing operation for the wireless electronic device through the intermediate device. In some implementations, the processor is configured to provide the pairing information of the wireless electronic device without receiving any request from the wireless electronic device to initiate the pairing operation for the wireless electronic device. In some implementations, the processor is further configured to provide information that includes at least one of available wireless connection types for the wireless communication link or data types exchangeable over the wireless communication link.

In some implementations, the processor is further configured to initiate the pairing operation for another wireless electronic device to the source device upon detecting pairing information of the another wireless electronic device in the storage. In some implementations, the intermediate device is disposed on a passenger vehicle and associated with a passenger on the passenger vehicle and the source device corresponds to an entertainment system disposed on the passenger vehicle.

Various techniques preferably incorporated within some embodiments may provide an apparatus for providing contents to electronic devices in a passenger vehicle. The apparatus comprises: a processor included in a source device and configured with processor-executable instructions to: receive, from a first electronic device having a wireless connection with a second electronic device, a request to proceed a pairing operation for the second electronic device; receive, from the first electronic device, pairing information of the second electronic device, the pairing information of the second electronic device including a profile of the second electronic device that enables to complete the pairing operation such that a wireless communication link is established between the wireless electronic device and the source device based on the pairing information of the wireless electronic device; and provide, by the source device to the second electronic device, contents over the wireless communication link. The source device, a first electronic device, and a second electronic device may correspond to a an IFE system, a PED, a wireless electronic device, which are discussed with the implementations as shown in FIGS. 3-8.

In some implementations, the instructions further instruct the processor to receive, from the first electronic device, another request for proceeding an additional pairing operation for a third wireless electronic device to connect the third wireless electronic device to the source device. In some implementations, the instructions further instruct the processor to receive, from the first electronic device, pairing information of the third wireless electronic device that includes a profile of the third electronic device. In some implementations, the source device is in communication with the first electronic device including a storage storing the pairing information of the second electronic device and a processor configured to automatically send the request to proceed the pairing operation of the second electronic device upon detecting the profile of the second electronic device. In some implementations, the source device is in communication with the first electronic device including a storage storing the pairing information of the second electronic device and a processor having an application, upon being executed, to initiate the pairing operation for the wireless electronic device on behalf of the wireless electronic device by sending the request to proceed the pairing operation for the second electronic device. In some implementations, the source device is configured to implement a short range wireless air interface protocol that does not provide an over-the-air power control procedure.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. An apparatus for assisting a pairing operation, the apparatus operating as an intermediate device and comprising:
    a processor included in the intermediate device configured to communicate with a source device to which a wireless electronic device is to be wirelessly connected through the pairing operation; and
    a storage included in the intermediate device and configured to communicate with the processor, the storage configured to store pairing information of the wireless electronic device, the pairing information including a profile of the wireless electronic device that enables to complete the pairing operation with the source device,
    wherein the storage further stores instructions, upon being executed, to instruct the processor to:
    determine to initiate the pairing operation for the wireless electronic device; and
    provide the pairing information of the wireless electronic device to the source device such that a wireless communication link is established between the wireless electronic device and the source device based on the pairing information of the wireless electronic device,
    wherein the instructions further instruct the processor to:
    receive, from the wireless electronic device, a request to perform the pairing operation for establishing a wireless connection between the wireless electronic device and the intermediate device; and
    receive the pairing information of the wireless electronic device through the pairing operation between the wireless electronic device and the intermediate device.

2. The apparatus of claim 1, wherein the processor is configured to detect the wireless electronic device wirelessly connected to the intermediate device by locating the pairing information of the wireless electronic device in the storage.

3. The apparatus of claim 1, wherein the processor is further configured to provide a message to request for a confirmation to initiate the pairing operation for the wireless electronic device through the intermediate device.

4. The apparatus of claim 1, wherein the processor is configured to provide the pairing information of the wireless electronic device without receiving any request from the wireless electronic device to initiate the pairing operation for the wireless electronic device.

5. The apparatus of claim 1, wherein the processor is further configured to provide information that includes at least one of available wireless connection types for the wireless communication link or data types exchangeable over the wireless communication link.

6. The apparatus of claim 1, wherein the processor is further configured to initiate the pairing operation for another wireless electronic device to the source device upon detecting pairing information of the another wireless electronic device in the storage.

7. The apparatus of claim 1, wherein the intermediate device is disposed on a passenger vehicle and associated with a passenger on the passenger vehicle and the source device corresponds to an entertainment system disposed on the passenger vehicle.

8. A method for pairing a wireless electronic device to an in-vehicle entertainment system disposed on a passenger vehicle, comprising:
    determining, by a passenger electronic device on a passenger vehicle and having a wireless connection with the wireless electronic device, to initiate a pairing operation for pairing the wireless electronic device to the in-vehicle entertainment system; and
    providing, by the passenger electronic device to the in-vehicle entertainment system, pairing information of the wireless electronic device stored in the passenger electronic device, the pairing information of the wireless electronic device including a profile of the wireless electronic device that enables to complete the pairing operation, thereby establishing a wireless communication link between the wireless electronic device and the in-vehicle entertainment system based on the pairing information of the wireless electronic device, and
    wherein the method further comprises:
    receiving, by a passenger electronic device and from the wireless electronic device, a request to perform the pairing operation for establishing the wireless connection between the wireless electronic device and the passenger electronic device; and
    receiving the pairing information of the wireless electronic device through the pairing operation between the wireless electronic device and the passenger electronic device.

9. The method of claim 8, wherein the determining to initiate the pairing operation further includes:
    transmitting a message requesting for a confirmation to initiate the pairing operation on behalf of the wireless electronic device; and
    receiving the confirmation to initiate the pairing operation for pairing the wireless electronic device to the in-vehicle entertainment system.

10. The method of claim 8, wherein the determining to initiate the pairing operation further includes:
    detecting the wireless electronic device having the wireless connection with the passenger electronic device.

11. The method of claim 8, further comprising:
    determining to initiate the pairing operation for another wireless electronic device to the in-vehicle entertainment system, the another wireless electronic device has the wireless connection with the passenger electronic device and pairing information of the another wireless electronic device stored in the passenger electronic device.

12. The method of claim 8, wherein the determining and the providing are performed by executing a software application installed on the passenger electronic device.

13. The method of claim 8, further comprising:
    providing information that includes at least one of available wireless connection types for the wireless communication link or data types exchangeable over the wireless communication link.

14. An apparatus for providing contents to electronic devices in a passenger vehicle, the apparatus operating as a source device and comprising:

a processor included in the source device and configured with processor-executable instructions to:

receive, from a first electronic device having a wireless connection with a second electronic device, a request to proceed a pairing operation for the second electronic device;

receive, from the first electronic device, pairing information of the second electronic device, the pairing information of the second electronic device including a profile of the second electronic device that enables to complete the pairing operation such that a wireless communication link is established between the second electronic device and the source device based on the pairing information of the second electronic device; and provide, by the source device to the second electronic device, contents over the wireless communication link, and wherein the processor-executable instructions further instruct the processor to receive, from the first electronic device, another request for proceeding an additional pairing operation for a third wireless electronic device to connect the third wireless electronic device to the source device.

15. The apparatus of claim 14, wherein the processor-executable instructions further instruct the processor to receive, from the first electronic device, pairing information of the third wireless electronic device that includes a profile of the third wireless electronic device.

16. The apparatus of claim 14, wherein the source device is configured to communicate with the first electronic device including a storage storing the pairing information of the second electronic device and a processor configured to automatically send the request to proceed the pairing operation of the second electronic device upon detecting the profile of the second electronic device.

17. The apparatus of claim 15, wherein the source device is configured to communicate the first electronic device including a storage storing the pairing information of the second electronic device and a processor having an application, upon being executed, to initiate the pairing operation for the second electronic device on behalf of the second electronic device by sending the request to proceed the pairing operation for the second electronic device.

18. The apparatus of claim 14, wherein the source device is configured to implement a short range wireless air interface protocol that does not provide an over-the-air power control procedure.

* * * * *